(12) United States Patent
Kahn et al.

(10) Patent No.: US 8,079,043 B2
(45) Date of Patent: *Dec. 13, 2011

(54) SERVICE ACTIVATION OF SET-TOP BOX FUNCTIONALITY USING BROADCAST CONDITIONAL ACCESS SYSTEM

(75) Inventors: Raynold M. Kahn, Los Angeles, CA (US); Gregory J. Gagnon, Torrance, CA (US); Thomas H. James, Pacific Palisades, CA (US); Stephen P. Dulac, Santa Clarita, CA (US); Jeffrey D. Carpenter, Pasadena, CA (US); Robert G. Arsenault, Redondo Beach, CA (US); Aspandyar M. Jijina, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 12/403,057

(22) Filed: Mar. 12, 2009

(65) Prior Publication Data

US 2009/0172722 A1     Jul. 2, 2009

Related U.S. Application Data

(63) Continuation of application No. 10/920,498, filed on Aug. 17, 2004, now Pat. No. 7,543,317.

(51) Int. Cl.
*H04N 7/16* (2011.01)
*H04N 7/167* (2011.01)
*G06F 7/04* (2006.01)
*G06F 15/16* (2006.01)
*G06F 17/30* (2006.01)

(52) U.S. Cl. .............. 725/25; 725/28; 725/29; 725/31; 726/2; 726/4; 726/9; 380/210

(58) Field of Classification Search .............. 725/25–31; 726/2, 4, 9; 380/210
See application file for complete search history.

(56) References Cited

U.S. PATENT DOCUMENTS

| 4,613,901 A | 9/1986 | Gilhousen et al. |
| 4,633,309 A | 12/1986 | Li et al. |

(Continued)

FOREIGN PATENT DOCUMENTS

EP    0817485 D2    1/1998

(Continued)

OTHER PUBLICATIONS

"Introduction to Encryption Theory", published by Kyoritsu Shuppan Co., Feb. 25, 1993.

(Continued)

*Primary Examiner* — Dominic D Saltarelli

(57) ABSTRACT

A method, apparatus, and article of manufacture provide the ability to activate functionality in a set-top box 500. A feature authorization message is received in a set-top box 500. The feature authorization message comprises one or more rules to be evaluated (wherein each of the rules comprises one or more tests for a status of one or more conditional access module 502 attributes), one or more event requirements for rule evaluation, and one or more features that are dependent by the rule evaluation result (wherein each of the one or more features represents a set of one or more abilities of hardware and/or software of the set-top box 500). When one or more of the event requirements have been met, the one or more rules are evaluated to obtain a result. The ability to use the one or more features are then set based on the result.

20 Claims, 10 Drawing Sheets

U.S. PATENT DOCUMENTS

| | | |
|---|---|---|
| 4,675,732 A | 6/1987 | Oleson |
| 4,866,769 A | 9/1989 | Karp |
| 4,866,787 A | 9/1989 | Oleson |
| 5,033,084 A | 7/1991 | Beecher |
| 5,132,992 A | 7/1992 | Yurt et al. |
| 5,168,353 A | 12/1992 | Walker et al. |
| 5,172,413 A | 12/1992 | Bradley et al. |
| 5,199,066 A | 3/1993 | Logan |
| 5,301,352 A | 4/1994 | Nakagawa et al. |
| 5,357,276 A | 10/1994 | Banker et al. |
| 5,371,551 A | 12/1994 | Logan et al. |
| 5,386,587 A | 1/1995 | Yuzawa |
| 5,396,293 A | 3/1995 | Shellard |
| 5,420,866 A | 5/1995 | Wasilewski |
| 5,438,423 A | 8/1995 | Lynch et al. |
| 5,440,336 A | 8/1995 | Buhro et al. |
| 5,473,609 A | 12/1995 | Chaney |
| 5,495,531 A | 2/1996 | Smiedt |
| 5,557,541 A | 9/1996 | Schulhof et al. |
| 5,565,805 A | 10/1996 | Nakagawa et al. |
| 5,583,937 A | 12/1996 | Ullrich et al. |
| 5,586,264 A | 12/1996 | Belknap et al. |
| 5,590,202 A | 12/1996 | Bestler et al. |
| 5,592,551 A | 1/1997 | Lett et al. |
| 5,592,651 A | 1/1997 | Rackman |
| 5,594,491 A | 1/1997 | Hodge et al. |
| 5,619,247 A | 4/1997 | Russo |
| 5,640,453 A | 6/1997 | Schuchman et al. |
| 5,642,418 A | 6/1997 | Farris et al. |
| 5,663,896 A | 9/1997 | Aucsmith |
| 5,675,390 A | 10/1997 | Schindler et al. |
| 5,677,895 A | 10/1997 | Mankovitz |
| 5,701,383 A | 12/1997 | Russo et al. |
| 5,710,970 A | 1/1998 | Walters et al. |
| 5,715,315 A | 2/1998 | Handelman |
| 5,715,403 A | 2/1998 | Stefik |
| 5,721,829 A | 2/1998 | Dunn et al. |
| 5,724,646 A | 3/1998 | Ganek et al. |
| 5,729,280 A | 3/1998 | Inoue et al. |
| 5,748,732 A | 5/1998 | Le Berre et al. |
| 5,761,302 A | 6/1998 | Park |
| 5,764,762 A | 6/1998 | Kazmierczak et al. |
| 5,778,068 A | 7/1998 | Johnson et al. |
| 5,784,095 A | 7/1998 | Robbins et al. |
| 5,790,663 A | 8/1998 | Lee et al. |
| 5,793,971 A | 8/1998 | Fujita et al. |
| 5,805,699 A | 9/1998 | Akiyama et al. |
| 5,826,166 A | 10/1998 | Brooks et al. |
| 5,831,664 A | 11/1998 | Wharton et al. |
| 5,845,240 A | 12/1998 | Fielder |
| 5,850,218 A | 12/1998 | La Joie et al. |
| 5,899,582 A | 5/1999 | DuLac |
| 5,912,969 A | 6/1999 | Sasamoto et al. |
| 5,914,941 A | 6/1999 | Janky |
| 5,926,205 A | 7/1999 | Krause et al. |
| 5,930,215 A | 7/1999 | Fite et al. |
| 5,933,500 A | 8/1999 | Blatter et al. |
| 5,937,067 A | 8/1999 | Thatcher et al. |
| 5,953,418 A | 9/1999 | Bock et al. |
| 5,966,186 A | 10/1999 | Shigihara et al. |
| 5,973,756 A | 10/1999 | Erlin |
| 5,990,927 A | 11/1999 | Hendricks et al. |
| 5,999,628 A | 12/1999 | Chan |
| 5,999,629 A | 12/1999 | Heer et al. |
| 6,005,937 A | 12/1999 | Lee |
| 6,011,511 A | 1/2000 | Chuong et al. |
| 6,016,348 A | 1/2000 | Blatter et al. |
| 6,025,868 A | 2/2000 | Russo |
| 6,035,037 A | 3/2000 | Chaney |
| 6,035,038 A | 3/2000 | Campinos et al. |
| 6,055,314 A | 4/2000 | Spies et al. |
| 6,055,566 A | 4/2000 | Kikinis |
| 6,061,451 A | 5/2000 | Muratani et al. |
| 6,061,452 A | 5/2000 | Suzuki |
| 6,069,647 A | 5/2000 | Sullivan et al. |
| 6,072,873 A | 6/2000 | Bewick |
| 6,072,982 A | 6/2000 | Haddad |
| 6,075,330 A | 6/2000 | Terk |
| 6,091,883 A | 7/2000 | Artigalas et al. |
| 6,097,441 A | 8/2000 | Allport |
| 6,144,400 A | 11/2000 | Ebisawa |
| 6,157,719 A | 12/2000 | Wasilewski et al. |
| 6,157,949 A | 12/2000 | Cheng et al. |
| 6,160,988 A | 12/2000 | Shroyer et al. |
| 6,169,543 B1 | 1/2001 | Wehmeyer |
| 6,169,879 B1 | 1/2001 | Perlman |
| 6,198,875 B1 | 3/2001 | Edenson et al. |
| 6,202,211 B1 | 3/2001 | Williams, Jr. |
| 6,222,925 B1 | 4/2001 | Shiels et al. |
| 6,226,794 B1 | 5/2001 | Anderson, Jr. et al. |
| 6,229,895 B1 | 5/2001 | Son et al. |
| 6,240,401 B1 | 5/2001 | Oren et al. |
| 6,252,964 B1 | 6/2001 | Wasilewski et al. |
| 6,263,504 B1 | 7/2001 | Ebisawa |
| 6,266,481 B1 | 7/2001 | Lee et al. |
| 6,282,715 B1 | 8/2001 | Barraud |
| 6,286,142 B1 | 9/2001 | Ehreth |
| 6,288,716 B1 | 9/2001 | Humpleman et al. |
| 6,289,455 B1 | 9/2001 | Kocher et al. |
| 6,317,883 B2 | 11/2001 | Marics |
| 6,317,884 B1 | 11/2001 | Eames et al. |
| 6,351,270 B1 | 2/2002 | Nishikawa et al. |
| 6,370,688 B1 | 4/2002 | Hejna, Jr. |
| 6,398,245 B1 | 6/2002 | Gruse et al. |
| 6,415,031 B1 | 7/2002 | Colligan et al. |
| 6,437,836 B1 | 8/2002 | Huang et al. |
| 6,456,985 B1 | 9/2002 | Ohtsuka |
| 6,466,671 B1 | 10/2002 | Maillard et al. |
| 6,466,921 B1 | 10/2002 | Cordery et al. |
| 6,473,858 B1 | 10/2002 | Shimomura et al. |
| 6,480,667 B1 | 11/2002 | O'Connor |
| 6,487,663 B1 | 11/2002 | Jaisimha et al. |
| 6,487,722 B1 | 11/2002 | Okura et al. |
| 6,496,980 B1 | 12/2002 | Tillman et al. |
| 6,502,139 B1 | 12/2002 | Birk et al. |
| 6,516,465 B1 | 2/2003 | Paskins |
| 6,519,772 B1 | 2/2003 | Bopardikar |
| 6,530,085 B1 | 3/2003 | Perlman |
| 6,542,870 B1 | 4/2003 | Matsumoto |
| 6,550,011 B1 | 4/2003 | Sims, III |
| 6,574,609 B1 | 6/2003 | Downs et al. |
| 6,611,812 B2 | 8/2003 | Hurtado et al. |
| 6,654,547 B1 | 11/2003 | Maeda et al. |
| 6,655,580 B1 | 12/2003 | Ergo et al. |
| 6,671,881 B1 | 12/2003 | Tamer et al. |
| 6,772,434 B1 | 8/2004 | Godwin |
| 6,853,728 B1 | 2/2005 | Kahn et al. |
| 2001/0001876 A1 | 5/2001 | Morgan et al. |
| 2001/0046299 A1 | 11/2001 | Wasilewski et al. |
| 2002/0001386 A1 | 1/2002 | Akiyama |
| 2002/0010920 A1 | 1/2002 | Bertram |
| 2002/0023219 A1 | 2/2002 | Treffers et al. |
| 2002/0048367 A1 | 4/2002 | Maillard |
| 2002/0056112 A1 | 5/2002 | Dureau et al. |
| 2002/0112243 A1 | 8/2002 | Hunter et al. |
| 2002/0170054 A1 | 11/2002 | Kudelski et al. |
| 2002/0196939 A1 | 12/2002 | Unger et al. |
| 2003/0002679 A1 | 1/2003 | Akiyama et al. |
| 2003/0002680 A1 | 1/2003 | Akiyama et al. |
| 2003/0040962 A1 | 2/2003 | Lewis |
| 2003/0061477 A1 | 3/2003 | Kahn et al. |
| 2003/0105718 A1 | 6/2003 | Hurtado et al. |
| 2003/0110132 A1 | 6/2003 | Sako |
| 2003/0145183 A1 | 7/2003 | Muehring |
| 2003/0174844 A1 | 9/2003 | Candelore |
| 2003/0228911 A1 | 12/2003 | Dernis et al. |
| 2004/0003079 A1 | 1/2004 | Aiu et al. |
| 2004/0102154 A1 | 5/2004 | Klauss et al. |

FOREIGN PATENT DOCUMENTS

| | | |
|---|---|---|
| EP | 0936812 | 8/1999 |
| EP | 1353511 | 10/2003 |
| EP | 1369152 | 12/2003 |
| GB | 2354392 | 3/2001 |
| JP | 4-175025 | 6/1992 |
| JP | 5-284499 | 10/1993 |
| JP | 06351023 | 12/1994 |

| | | |
|---|---|---|
| JP | 8-125651 | 5/1996 |
| JP | 9121340 | 5/1997 |
| JP | 10-013784 | 1/1998 |
| JP | 11136708 | 5/1999 |
| JP | 2000-122539 | 4/2000 |
| JP | 2000-504506 | 4/2000 |
| JP | 2001-513587 | 9/2001 |
| JP | 2002-152194 | 5/2002 |
| WO | WO 92/11713 | 7/1992 |
| WO | 95/33329 | 12/1995 |
| WO | 99/07145 | 2/1999 |
| WO | WO 00/13412 | 3/2000 |
| WO | WO 00/14967 | 3/2000 |
| WO | WO 00/19294 | 4/2000 |
| WO | WO 01/37546 | 5/2001 |
| WO | WO 01/99422 | 12/2001 |
| WO | WO 02/15184 | 2/2002 |
| WO | WO 02/065750 | 8/2002 |

OTHER PUBLICATIONS

P. Venkat Rangan et al., "Designing an On-Demand Multimedia Service", IEEE Communications Magazine, Jul. 1992, vol. 30, No. 7, title page and pp. 56-64.

Wanjiun Liao et al., "The Split and Merge Protocol for Interactive Video-On-Demand", IEEE Multimedia, Oct.-Dec. 1997, vol. 4, No. 4, index and pp. 51-62.

Robert Johnston et al., "A Digital Television Sequence Store", IEEE Transactions on Communications, May 1978, vol. COM-26, No. 5, index and pp. 594-600.

"Proposed SMPTE Standard for Television-Splice Points for MPEG-2 Transport Streams", SMPTE Journal, Oct. 1998, SMPTE 312M, pp. 916-925.

Michael Robin et al., "Digital Television Fundamentals—Design and Installation of Video and Audio Systems", McGraw-Hill, Chapter 8, title page(s) and pp. 345-425, 2000.

Yongchen Li et al., "Security Enhanced MPEG Player", IEEE, 1996, pp. 169-175.

Fink, Ready to take the dive? It's fast-forward as new DVD and divx formats hit market (includes graphic: home video: the next generation plus: Some selections that show off the system), . . . 2000.

Sin-Joo Lee et al., A Survey of Watermarking Techniques Applied to Multimedia, IEEE, 2001, pp. 272-277.

"PocketTV Brings Video to Palm-size PC", Mar. 9, 2000, 2 pages.

$1^{st}$ Report of EBU/SMPTE Task Force for Harmonized Standards for the Exchange of Television Program Material as Bit Streams, May 6, 1997, Version 1.30, pp. 1-73.

B. Schneier, "Applied Cryptography—Protocols, Algorithms, and Source Code in C", $2^{nd}$ Edition, pp. 216-222, 357-362, 2000.

HP JORNADA 430/430SE Palm-size PC: User's Guide, Hewlett Packard, 1999, pp. 7-9.

PocketTV-MPEG movie player for Pocket PCT and WinCE, May 17, 2000, MPEG TV, LLC, retrieved from URL: http://web.archive.org/web/20000062l0l23803/www.mpegtv.com/wince/pockettv/index.html.

Download PockeTV (beta) for WinCE, Nov. 3, 1999, MPEG TV, LLC, retrieved from HRL: http://web.archive.org/web/19991127093158/www.mpegtv.com/wince/pockettv/index.html.

Translated Japanese Office action dated Jan. 11, 2011 in Japanese Patent Application No. 2007-528106 filed Aug. 17, 2005 by Raynold M. Kahn et al.

EPO Communication dated Feb. 22, 2011 in European Patent Application No. 05796098.1 filed Aug. 17, 2005 by Raynold M. Kahn et al.

International Preliminary Report on Patentability dated Feb. 20, 2007 in International Application No. PCT/US2005/031980 filed Aug. 17, 2005 by Raynold M. Kahn et al.

International Search Report dated Apr. 24, 2006 in International Application No. PCT/US2005/031980 filed Aug. 17, 2005 by Raynold M. Kahn et al.

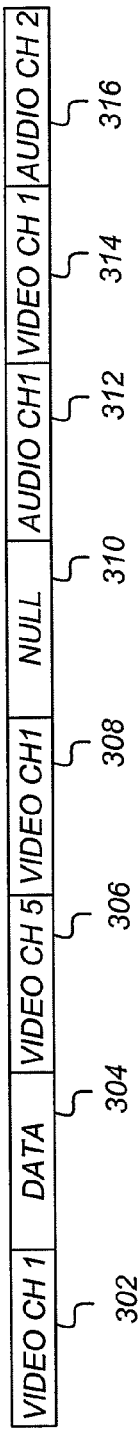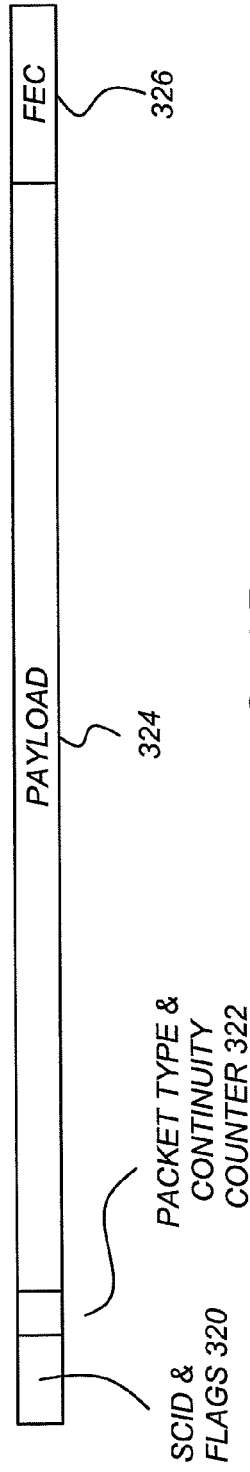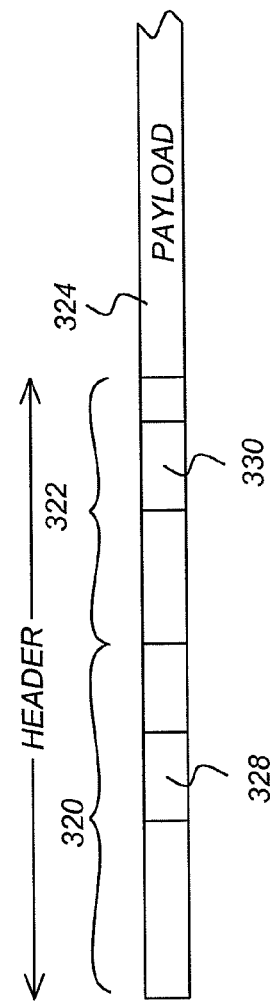

US 8,079,043 B2

SERVICE ACTIVATION OF SET-TOP BOX FUNCTIONALITY USING BROADCAST CONDITIONAL ACCESS SYSTEM

BACKGROUND OF THE INVENTION

1. Field of the Invention

The present invention relates to systems and methods for activating functionality in a set-top box and in particular to a method and system for a feature authorization scheme for activating set-top box capabilities.

2. Description of the Related Art

In recent years, there has been an increase in the interest and use in cable and satellite television services. Set-top boxes (STB) utilized to receive such services may also be used to offer additional advanced functionality that may require a monthly subscription. For example, personal video recording (PVR) and video games may be offered through the STB by a broadcast provider. In order to provide such STB services to customers of multi-channel programming, it is advantageous to have a method of activating services in a manner that is flexible and secure.

In the prior art, PVR service activation has utilized a two-way communication (such as by phone modem). For broadcast satellite receivers, it is advantageous if the STB service could be activated by one-way communication over the satellite.

It is especially advantageous if such a system were able to utilize the existing conditional access infrastructure for broadcast service authorization and billing using a secure smart-card in the STB. Such a system should preferably allow for flexible activation of a multitude of set-top box services with a similar level of security as the broadcast services. The prior art fails to provide such a method or capability. These problems may be better understood by a description of prior art conditional access services.

Broadcast service activation in the prior art involves authorization to receive an encrypted broadcast service, such as subscription television channels, or pay-per-view movie programs, or music or data services. These broadcast services are generally encrypted at the broadcast headend, and the conditional access controls include service activation and entitlement checking and the delivery of a decryption key (or control word CW) for the correct decryption of such broadcast services.

Conditional access for digital broadcast satellite (DBS) systems usually use a conditional access module (CAM) such as a smart card, for broadcast service activation. Authorization for services provided by the CAM are received by the CAM in over-the-air conditional access packets (CAPs). Broadcast services and programs have associated program access data (PAD) that specifies the services required for reception of that program, as well as possible limitations (e.g., regional blackout, parental rating controls). The PAD and CW for current programs are delivered via control word packets (CWP) to the CAM. The CAM checks the PAD, and if authorized, delivers the CW to the STB for program decryption.

The PAD for a future program is delivered to the CAM via program information packet (PIP) to allow pre-purchase of impulse pay-per-view (IPPV) programs or for checking authorizations before the broadcast (e.g., for guide "coloring"). The CAM checks the future PAD and responds to the PIP test with the CAM status regarding the future program, for example "authorized", "not authorized", "blacked out" or "IPPV allowed".

STB functions and services generally do not involve an encrypted stream of information, but merely the activation of advanced capabilities in the STB. Authorization for services provided by the STB may be activated in the CAM by over-the-air CAPs, and such authorizations may be checked by the STB via PIP test of the CAM.

The following description illustrates the service activation of DIRECTV DVR™ service in a STB in the prior art using CAPs. Except for the STB's initial factory state (DIRECTV DVR Service State 0="unknown"), the STB could only be in one of two states, DVR (digital video recorder) service authorized (e.g., DIRECTV DVR Service State 3="good") and DVR service not authorized (e.g., DIRECTV DVR Service State 13="declined"). Authorization for DIRECTV DVR service activation is provided by CAP authorization of a DVR service identifier in the CAM, which the STB checks via a PIP test "Is DVR service authorized?" for which the CAM status is "authorized" or "not authorized".

The PIP for testing DIRECTV DVR Service is encapsulated within a vendor object (VO) sent via the advanced program guide (APG) stream, and stored in the APG database or hard disk drive of the STB. If a new version of the VO is received, and on a periodic daily basis, the PIP test is performed by the STB to check for the activation status of the DIRECTV DVR service. This check can result in the service being turned on or turned off.

If the service is off, and the user attempts to access a DVR function, the STB rechecks whether the service has been activated using the PIP. This check may result in the service being turned on or remaining off.

Upon power-up of the STB, or upon card removal or insertion, the service state reverts to off (i.e., service not active). The STB must test the CAM using the PIP to check whether the service is authorized. Similar to above, the check may result in the service being turned on or remaining off.

Thus, in view of the above description of the prior art, the only verification that occurs to activate STB functionality is that of periodically checking to determine if the CAM has been authorized for a particular service. In comparison, the broadcast television services require the CAM to supply a frequently changing decryption CW.

The present invention addresses the above-described problems of the prior art and provides verification rules to activate STB functionality. This invention also allows these verification rules and the corresponding STB functions to be flexibly defined by over-the-air feature authorization messages.

SUMMARY OF THE INVENTION

Activation of card-based services are allowed using conditional access packets and by a set-top box querying and verifying such activation in a secure and continuous manner. When a test packet and a rule for evaluating the CAM response is received from a service provider, verification techniques already existing in the smart card and embedded software in the STB may be used to ensure that the authorization is valid.

In accordance with one or more embodiments of the invention, a multitude of authorization tests may occur, with each test having a different response if the service is authorized, as specified by the evaluation rule.

Various examples may be used to illustrate the use of one or more of these methods. For example, the STB may issue a PIP test to the smart card in such a manner that the smart card must use the PAD information in the PIP test and the service authorization data in the smart card and return an answer that the STB would expect to receive but which response may not be predicted without an authorized card.

For example, there may a be a PIP test "Is service A authorized?" where the appropriate response is "authorized" when service A is authorized. There may be a different PIP test "Is service B authorized?" where the appropriate response is "not authorized" when service A is authorized. There may be a third PIP test "If service A is authorized, then a blackout applies" where the appropriate response is "blacked out" when service A is authorized. In the prior art, the CAM status is explicit in the CAM response to a PIP test, whereas here the CAM status relative to service A must be evaluated by comparing the CAM response with the appropriate CAM response for each PIP test, as specified by the evaluation rule. With each test and correct response the confidence in the CAM status increases.

As another example, the packet being used for the test could be a control word packet (CWP), which would allow the additional step of incorporating the resulting control word (CW) into the response from the CAM. For example, the test provided to the STB may be a CWP where the appropriate response from the authorized CAM is the correct value of the CW. This also could be done in such a manner that each smart card/STB combination would have a different value in response to the test, such as where the CW is encrypted.

In these examples, the unauthorized smart card would not respond correctly, especially if the test or the response were encrypted, or if multiple tests were issued in random order and performed on a regular basis within a relatively short time span.

This invention includes a flexible message structure, which delivers data from the broadcaster to the set-top receiver, to define the tests and rules for evaluating the status based on the responses from the CAM, to specify the corresponding set-top box features and services that may be activated if the response is appropriate, and the applicable period between consecutive queries.

To provide such functionality (e.g., DVR functions, games or other digital services), one or more embodiments of the invention utilize a feature authorization message (FAM) that contains rules that test the status of conditional access module (CAM) attributes, event requirements that provide the timing for evaluating the rules, and features (of the STB) that are dependent on the rule evaluation result. The FAM may be delivered to the STB in a variety of manners and is then utilized within the STB. A feature authorization manager within the STB determines when the event requirements have been met, evaluates the rules accordingly, and activates/deactivates the dependent features depending on the result of the rule evaluation.

BRIEF DESCRIPTION OF THE DRAWINGS

Referring now to the drawings in which like reference numbers represent corresponding parts throughout:

FIG. 3A is a diagram of a representative data stream in accordance with one or more embodiments of the invention;

FIG. 3B is a diagram of a data packet in accordance with one or more embodiments of the invention;

FIG. 3C is a diagram of a data packet that is a conditional access packet in accordance with one or more embodiments of the invention;

DETAILED DESCRIPTION OF PREFERRED EMBODIMENTS

In the following description reference is made to the accompanying drawings which form a part hereof and which show, by way of illustration, several embodiments of the present invention. It is understood that other embodiments may be utilized and structural changes may be made without departing from the scope of the present invention.

Overview

The present invention is directed to a feature authorization scheme for activating set-top box capabilities. Specifically, the invention provides a software module that the receiver software must interact with to determine whether a customer's use of specific set top box features was authorized. The software code module is integrated with the main receiver software.

The general concept behind the invention may rely on two critical components of the conditional access system: the smart card and the conditional access software resident inside the set-top box (STB). If the STB software could ask the smart card to process a packet in such a way that only an authorized card could do correctly, then this may be used to activate features and functions within the STB. If the question is answered correctly once, then the authorization can be validated for a short time period. If a different question was asked again a short time later (e.g., 10 seconds), and the answer is still correct, then there is a higher confidence in the response. This round of questions and answers can continue until there is a very high confidence and feature authorization can be approved for a defined time (e.g., 24 hours) before the entire challenge process begins again. If at any time during this process, a question is answered incorrectly then the authorization for that service could be terminated immediately. This would ensure the service provider a high level of confidence that those who are receiving their services are actually authorized for its reception and those that are not authorized would have their access to that content stopped.

Video Distribution System

Figure 1:
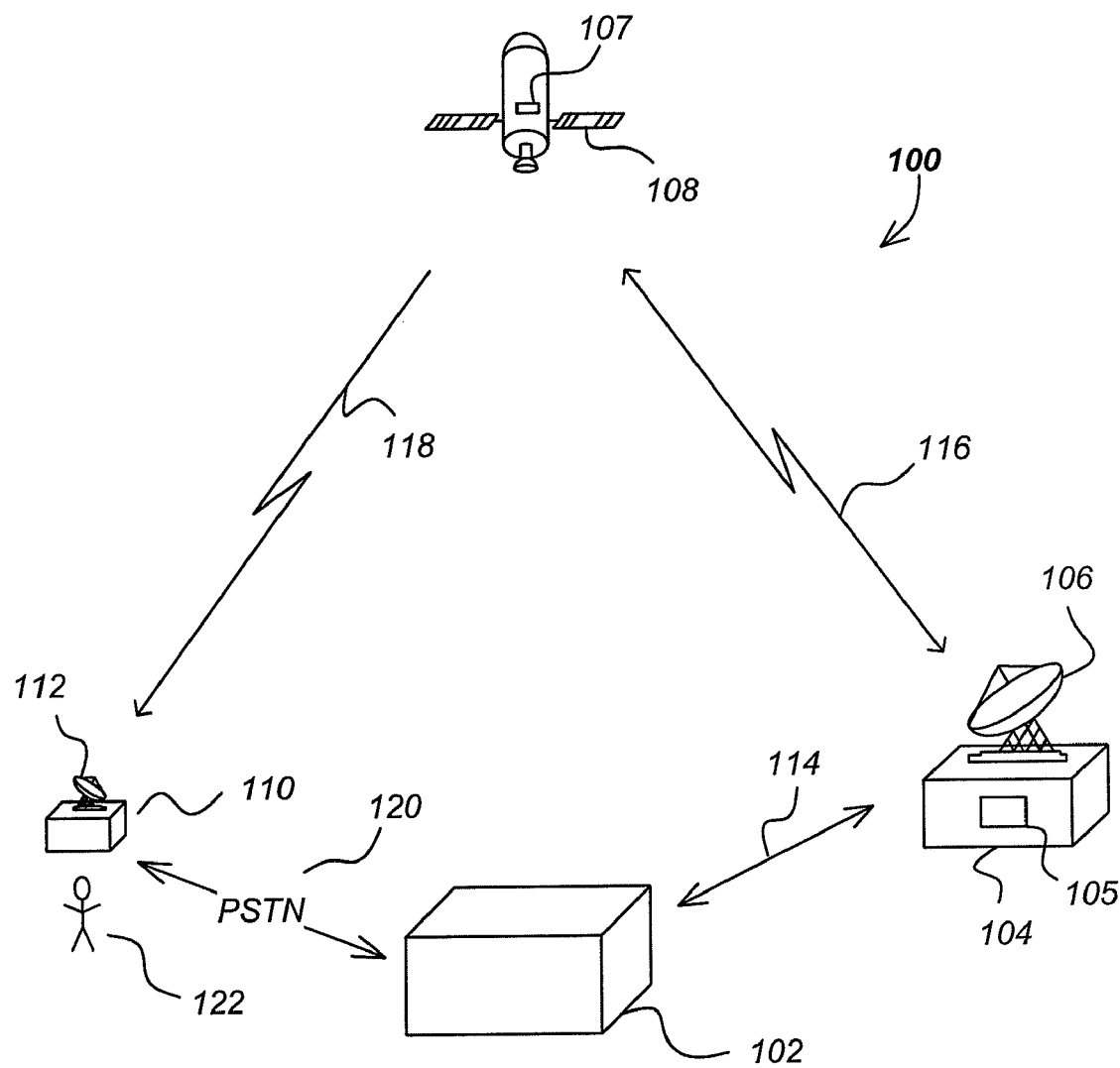
FIG. 1 is a diagram illustrating an overview of a single satellite video distribution system in accordance with one or more embodiments of the invention.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs and data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using transmitter 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well.

Uplink Configuration

Figure 2:
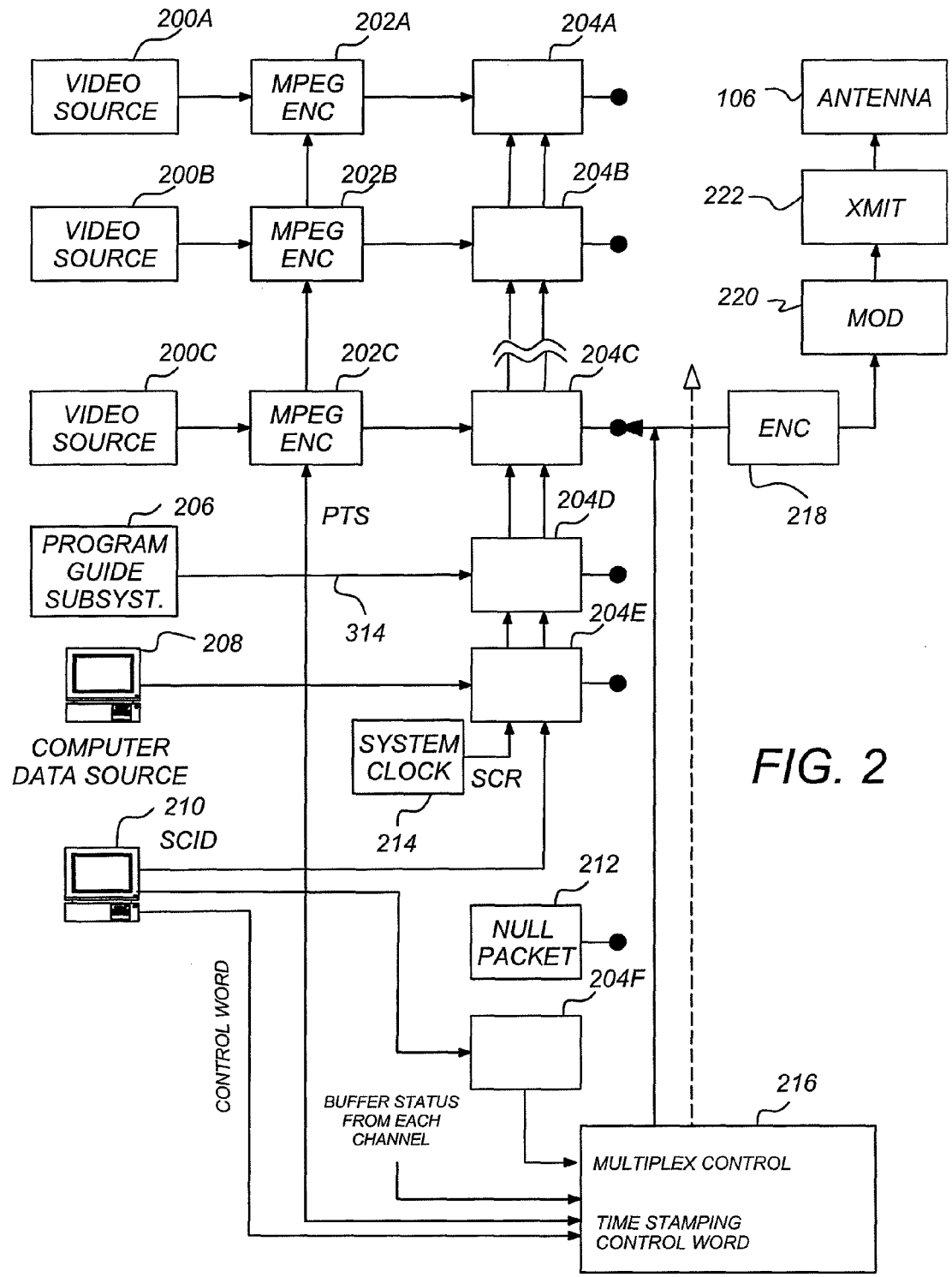
FIG. 2 is a block diagram showing a typical uplink configuration for a single satellite transponder in accordance with one or more embodiments of the invention.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), a data channel from a program guide subsystem 206 and computer data information from a computer data source 208.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200.

The data packets are assembled using a reference from the system clock 214 (SCR), a control word (CW) generated by the conditional access manager 208, and a system channel identifier (SCID) generator 210 that associates each of the data packets that are broadcast to the subscriber with a program channel. This information is transmitted to the packetizers 204 for use in generating the data packets. These data packets are then multiplexed into serial data, encoded, modulated, and transmitted.

A special packet known as a conditional access packet or CAP, which comprises conditional access information (CAI) and other control data used in support of providing conditional access to the program material is also encrypted and transmitted. Thus, CAI is sent to the subscriber's receivers to authorize presentation of the media programs. CAI may also used to cancel service, renew service, and to transmit other information to the subscriber's receiver. The user's receiver routes the packets to a conditional access module (CAM) (see detailed description below). Using the CAI, the CAM allows the encrypted media programs to be decrypted, this activating/deactivating service. Generally, CAPs are transmitted to all subscribers on all channels.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment includes information from video channel 1 (again, coming from the first video program source 200A). The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscribers 110 receive media programs via a subscriber receiver (also referred to as an integrated receiver-decoder [IRD] or set-top box [STB]). Using the SCID, the IRD reassembles the packets to regenerate the program material for each of the channels. As shown in FIG. 3A, null packets created by the null packet module 312 may be inserted into the data stream as desired.

FIG. 3B is a diagram of a data packet. Each data packet (e.g. 302-316) is 130 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 200. The final packet segment 326 is data required to perform forward error correction.

As shown in FIG. 3C, when the data packet is a CAP, first packet segment 320 or the second packet segment 322 can include data (328 or 330, respectively) indicating whether the CAP is a first type that is transmitted by all transponders (type A) or a data 328 or a type that is only transmitted by a subset of the transponders (type S). The first packet segment 320 or the second packet segment 322 can also be used to include data (328 or 330, respectively) including a channel identifier that indicates which channel is transmitting the CAP. In one embodiment, one or more signal bits can used to indicate that some of the bits in the first 320 or second packet segments 322 include CAI type and/or channel information. In another embodiment, data bits in the packet segment are dedicated to the transmission of the CAI type and/or channel information (although other information may be transmitted using these bits when no CAI type or channel information is included in the data packet). The CAI can also be transmitted by substituting bits in the data payload 324.

Although the header of the illustrated embodiment is eight (8) bits, the size of the header can be increased or decreased in order to provide sufficient room to identify more CAP data types or to accommodate additional channel identifiers. If desired, the header size can be different for CAPs (versus packets that have media program information) or can adaptively change based on data requirements.

The continuity counter increments once for each packet type and SCID. The next packet segment 324 comprises 127 bytes of payload data, which is a portion of the video program provided by the video program source 200. The final packet segment 326 is data required to perform forward error correction.

Program Guide Subsystem

Figure 4:
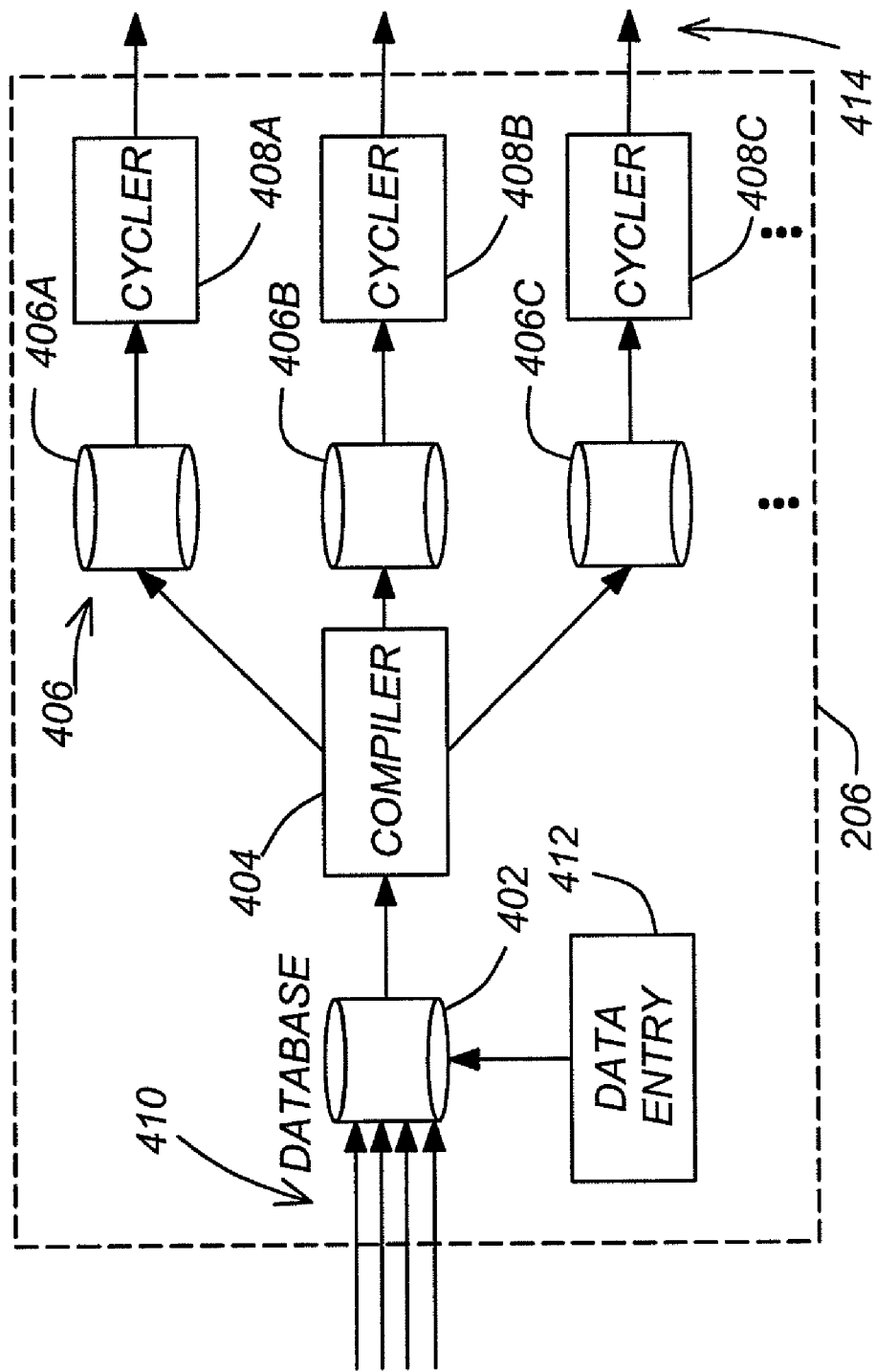
FIG. 4 is a block diagram of one embodiment of the program guide subsystem in accordance with one or more embodiments of the invention.

FIG. 4 is a block diagram of one embodiment of the program guide subsystem 206. The program guide data transmitting system 206 includes program guide database 402, compiler 404, sub-databases 406A-406C (collectively referred to as sub-databases 406) and cyclers 408A-408C (collectively referred to as cyclers 408).

Schedule feeds 410 provide electronic schedule information about the timing and content of various television channels, such as that found in television schedules contained in newspapers and television guides. Schedule feeds 410 preferably include information from one or more companies that specialize in providing schedule information, such as GNS™, TRIBUNE MEDIA SERVICES™, and T.V. DATA™. The data provided by companies such as GNS™, TRIBUNE MEDIA SERVICES™ and T.V. DATA™ are typically transmitted over telephone lines to program guide database 402. These companies provide television schedule data for all of the television stations across the nation plus the nationwide channels, such as SHOWTIME™, HBO™, and the DISNEY CHANNEL™. The specific format of the data that are provided by these companies varies from company to company. Program guide database 402 preferably includes schedule data for television channels across the entire nation including all nationwide channels and local channels, regardless of whether the channels are transmitted by the transmission station.

Program guide database 402 is a computer-based system that receives data from schedule feeds 410 and organizes the data into a standard format. Compiler 404 reads the standard form data out of program guide database 402, identifies common schedule portions, converts the program guide data into the proper format for transmission to users (specifically, the program guide data are converted into objects as discussed below) and outputs the program guide data to one or more of sub-databases 406.

Program guide data can also be manually entered into program guide database 402 through data entry station 412. Data entry station 412 allows an operator to enter additional scheduling information, as well as combining and organizing data supplied by the scheduling companies. As with the computer organized data, the manually entered data are converted by the compiler into separate objects and sent to one or more of sub-databases 406.

The program guide objects (referred to as program guide vendor objects) are temporarily stored in sub-databases 406 until cyclers 408 request the information. Each of cyclers 408 may transmit objects at a different rate than the other cyclers 408. For example, cycler 408A may transmit objects every second, while cyclers 408B and 408C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown later. Thus, the program guide objects for the most current programs are sent to a cycler 408 with a high rate of transmission, while program guide objects for later programs are sent to cyclers 408 with a lower rate of transmission. One or more of the data outputs 414 of the cyclers 408 are forwarded to the packetizer of a particular transponder, as depicted in FIG. 2.

It is noted that the uplink configuration depicted in FIG. 2 and the program guide subsystem depicted in FIG. 4 can be implemented by one or more hardware modules, one or more software modules defining instructions performed by a processor, or a combination of both.

Encryption of Media Programs

Media programs are encrypted by the encryption module 218 before transmission to assure that they are received and viewed only by authorized subscribers. Each media program is encrypted according to a numeric encryption key referred to hereinafter as a control word (CW). This can be accomplished by a variety of data encryption techniques, including symmetric algorithms such as the data encryption standard (DES) and the asymmetric algorithms such as the Rivest-Shamir-Adleman (RSA) algorithm.

To decrypt the media programs, the subscriber's 110 IRD must also have access to the CW. To maintain security, CWs are not transmitted to the IRD plaintext. Instead, CWs are encrypted before transmission to the subscriber's IRD. The encrypted CW is transmitted to the subscriber's IRD in a control word (data) packet (CWP).

In one embodiment, the data in the CWP, including the CW, is encrypted and decrypted via what is referred to hereinafter as an input/output (I/O) indecipherable algorithm.

An I/O indecipherable algorithm is an algorithm that is applied to an input data stream to produce an output data stream. Although the input data stream uniquely determines the output data stream, the algorithm selected is such that it's characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD share the same I/O indecipherable algorithm, the IRD can decode the information in the CWP to retrieve the CW. Then, using the CW, the IRD can decrypt the media program so that it can be presented to the subscriber 110.

Broadcast services and programs have associated program access data (PAD) that specifies the services required for reception of that program, as well as possible limitations (e.g., regional blackout, parental rating controls). The CAM compares the access requirements and limitations with service authorizations and subscriber attributes stored in the CAM, to determine whether or not service is permitted. The PAD may include expressions (or data structures equivalent to expressions) such as "required service=A", "blackout service if geographic region B", "if condition C do not evaluate the following expression", "purchase IPPV service=D at price=P", and "program rating=R".

The PAD for a future program is delivered to the CAM via program information packet (PIP) to allow pre-purchase of impulse pay-per-view (IPPV) programs or for checking authorizations before the broadcast (e.g., for guide "coloring"). The CAM checks the future PAD and responds to the PIP test with the CAM status regarding the future program, for example "authorized", "not authorized", "blacked out", "parental rating exceeded" or "IPPV allowed".

The PAD and CW for current programs are delivered via control word packets (CWP) to the CAM. The CAM checks the PAD, and if authorized, delivers the CW to the STB for program decryption. The CW may be encrypted by the CAM for delivery to the STB, using a key that is shared between the CAM and STB, which protects the value of the CW, and uniquely pairs the CAM and the STB.

Feature Authorization Message Overview

As described above, embodiments of the invention provide a feature authorization scheme for activating STB capabilities, such as personal video recording (PVR), video games, and other advanced functions that may require a monthly subscription for operation. In order to provide a variety of STB services to customers of multi-channel programming, it is advantageous to have a method of activating services in a manner that is secure and expandable.

To provide such functionality, the invention utilizes a feature authorization message (FAM). A FAM is an encapsulation of three elements: (1) one or more rules to be evaluated; (2) one or more timing requirements for rule evaluation; and (3) the features that are dependent by that evaluation result. A FAM may be transmitted to a an STB from a network operator (i.e., from uplink center 104) in a variety of ways. The STB channels the received FAM to a specialized piece of software (which may be integrated with the main STB software), referred to as the vault manager (also referred to as a feature authorizer), that may store the FAM in random access memory and processes it. The vault manager interacts with a verifier in the STB (see detailed description below) but may run in a different address space from the verifier.

Thus, the vault manager may be asked (at particular times) whether a particular function/features of the STB is authorized. The vault manager may interact with the verifier and/or smart card to determine such authorization. As described above, the simplest form this interaction could take is the submission of a PIP for evaluation by the smart card and checking whether the response is consistent with the desired authorization. Rather than a direct query for authorization status, the PAD in the PIP may trigger an unpredictable response from the smart card, from which the authorization status can be deduced by comparison with a correct response delivered to the vault manager by the evaluation rule of the FAM. Additional interactions may also be permitted and with each test and correct response the confidence increases. Such additional interactions may rely on testing the card attributes like subscription ownership and region membership (all of which may be set or cleared via a standard CAP mechanism).

The vault manager's interactions with the smart card may generally involve delivery of some kind of data objects (e.g., PIPs in the simplest case) to the smart card. For example, when received, these objects may be packaged into FAMs that may only be kept in volatile memory and may never be stored on disk.

Feature Authorization Message Transmission

A FAM or FAMs can be embedded in a CAP that carries a data-to-sts (set top software) command. This allows signature validation and supports all modes of CAP addressing. In this regard, a CAP is one DSS (digital satellite system) packet, hence a CAP delivered token is small unless a frame layer is added so that two or more CAPs are formatted to deliver portions of the same FAM. A FAM or FAMs can also be delivered in a file to the feature authorizing client (in the receiver) using the satellite 108 data broadcast protocol specification. Additionally, a FAM or FAMs can be delivered in a System Information (SI) control stream, such as in the program guide or in a MPEG private section. An example of delivering a FAM in the SI is embodying a FAM inside a program guide Vendor Object (VO).

In view of the above, a FAM may be targeted to specific IRDs via a targeting mechanism in the CAP header (i.e., for FAMs delivered via the data-to-sts command). In addition to targeting a FAM to a specific IRD, FAMs may be targeted internally depending on the FAM structure. For example, a FAM be targeted based on one or more of the following:

(1) brand of IRD;
(2) hard disk;
(3) model;
(4) characteristics of the IRD; and
(5) any other property/characteristic of the hardware of the IRD.

Thus, a FAM may be targeted regardless of whether it is sent via APG, data file broadcast, and/or CAP.

Feature Authorization Message Details

The rules in a FAM can be complex Boolean expressions, or they can be compounded with other rules to strengthen the confidence of the result. In the former case, a rule could be "if HBO™ service is active or SHOWTIME™ service is active and not CINEMAX™ service is active." In the later case, a series of tests could be executed, and reexecuted, each progressively building confidence that the customer is legitimately entitled to a service.

The timing requirements in a FAM can be basic time of day instructions, such as every hour or at 10 pm, as well as event based, such as at subscriber service level adjustment.

There also can be two sets of testing rules and timing requirements: one to enable the set of features and another to maintain or disable the set of features.

The features described within a FAM are symbolic, and match those inherent in the receiver hardware or software. Features are switched on or off based on the rule evaluation. A feature is an abstract identifier that the receiver recognizes and maps to a set of abilities of the receiver's hardware or software. The receiver has abilities, and some are referred to as an activatable feature, and they are called f1, f2, f3, . . . . Features are hard coded in the receiver's software and a feature's identifier is hard coded. A feature's identifier may be a hierarchical string (e.g. "dvr.trick.pause"), numbers, or a hybrid (e.g., a hierarchical string and/or numbers).

As described herein, features of the STB may also be either hard features, soft features, or a combination of both hard and soft features. Soft features are arbitrarily defined features provided in the software of the STB (e.g., network offered services). Alternatively, hard features are features dependent on the hardware of the STB (e.g., commands to control or configure the hardware of the STB).

The receiver has these activatable features organized in sets, called s1, s2, s3, . . . . The sets of features are defined via the interface and are not hard coded. Sets can be empty, or have one or more features. For ease of management and to achieve deterministic results, every feature may be required to be in exactly and only one set. The following provides examples of some sets:

s1={f1, f2} s2={f3} s3={ }

Thus, as described herein, a FAM references a set of features, and supplies a rule and evaluation instructions. The set of features may be independently enabled or disabled by a rule's evaluated result. The rule may be called r. A receiver/STB evaluates the rule per an evaluation instruction, called e.

Features may be mapped to sets based on network control (not hardcoded groupings). Additionally, a receiver might restrict the flexibility so that some features must be grouped together. Rules may be based on services authorized in a conditional access module (CAM) as described above or delivered straight to the STB in the form of commands addressed by data-to-sts commands (e.g. turn ON, turn OFF). Further, evaluation methods may be expressed for two phases: currently disabled checking to become on; currently enabled checking to become off. Evaluation events can be periodic time intervals, system states, or customer actions.

In addition to standard FAMs (as described above), one or more embodiments of the invention may provide for alternative types of FAMs. For example, in various embodiments, feature values may be set and can stack up. In this regard, a mechanism for resetting and deleting features and states that are no longer needed/useful may be beneficial. Accordingly, embodiments of the invention may provide a FAM that lists those features that are currently valid. The vault manager may then process the FAM and delete those features that are not listed in the FAM.

It also may be desirable to configure properties of the vault manager via the broadcast. For example, it may be beneficial to set/configure the cycles of the vault manager and examine features to see if events have occurred. Accordingly, an alternative type of FAM allows properties of the vault manager to be configured. For example, the FAM may provide the ability to set one or more of the following properties:

(1) the maximum number of features per FAM;
(2) the maximum number of events per FAM;
(3) the maximum number of targets per FAM;
(4) the maximum number of configurations per FAM;
(5) the maximum number of methods per FAM;
(6) the maximum total features;
(7) the maximum total number of soft features;
(8) the maximum total number of hard features;
(9) the maximum total number of events;
(10) the maximum total number of methods;
(11) the maximum total number of FAMs that may be stored;
(12) the maximum signature length; and
(13) the maximum conditional expression length.

Alternatively, instead of specifying maximum values for the above properties, such a FAM may specify minimum values, or specific values.

Feature Authorization Message Syntax Example

The description below is merely an illustrative example, lacking the data type definitions for a FAM. The example illustrates how features are combined into a set, and that set of features is clustered with rules to turn on and rules to turn off. Note that there can be multiple triggers to executing a given rule, and that there can be one or more methods of supplying the test to the IRD (by a data-to-STS command, an APG VO or a file delivered using the satellite data broadcast protocol).

The XML (extensible markup language) provided herein may be compiled or compressed into a binary format to reduce its size. Alternatively, a binary structure can be created similar to an MPEG private section, to present the same type of information as this XML example provides.

Table 1 provides an example of the terminology used herein.

TABLE 1

| | |
|---|---|
| Feature | A core capability of the IRD (e.g., pause, rewind, etc.). Features are hard coded in the receiver's software and a feature's identifier is hard coded. A feature's identifier is a hierarchical string (e.g. "dvr.trick.pause"). |
| FeatureSet | A grouping of Features. A Feature can be included in more than one FeatureSet. The Features that comprise a FeatureSet is defined via network control. The FeatureSet is activated and deactivated via network control. A FeatureSet can be empty. |
| RuleMethod | The method used for testing a Rule. A RuleMethod can be: (1) test one or more services authorized in the CAM; or (2) test one or more parameters delivered straight to the IRD via commands addressed by data-to-sts commands. |
| RuleMethodSet | A grouping of methods to test a Rule. Any one RuleMethod in a RuleMethodSet can be used interchangably with all other RuleMethods in the RuleMethodSet. |

TABLE 1-continued

| | |
|---|---|
| RuleEvent | The trigger used to test a Rule. A RuleEvent can be based on: (1) periodic time intervals, (2) system states, or (3) customer actions. |
| RuleEventSet | A grouping of events to test a Rule. Any one RuleEvent in a RuleEventSet can trigger a test of the Rule. The result of which can enable and/or disable the FeatureSet. |
| Token | A record containing a FeatureSet, RuleMethodSet and RuleEventSet. |

Table 2 provides an example of an XML definition for a FAM in accordance with one or more embodiments of the invention.

TABLE 2

```
1   <!ELEMENT FeatureAuthorization ( Title, FileHeader, Token ) >
2   <!ELEMENT Title ( #PCDATA ) >
3   <!ELEMENT FileHeader ( FileType, FormatVersion, DataSource,
        CreationTime ) >
4     <!ELEMENT FileType ( #PCDATA ) >
5     <!ELEMENT FormatVersion ( #PCDATA ) >
6     <!ELEMENT DataSource ( #PCDATA ) >
7     <!ELEMENT CreationTime ( #PCDATA ) >
8   <!ELEMENT Token ( FeatureSet, RecordMethodSet, RecordEventSet)
9   <!ATTLIST Token RecordNumber NMTOKEN #REQUIRED >
10    <!ELEMENT FeatureSet ( Feature+ ) >
11      <!ELEMENT Feature ( #PCDATA ) >
12    <!ELEMENT RuleMethodSet ( RuleMethod+ ) >
13      <!ELEMENT RuleMethod ( RuleMethodID, RuleMethodType,
        Code, Operand?, FileID?, VOObjectID? ) >
15        <!ELEMENT RuleMethodID ( #PCDATA ) >
16        <!ELEMENT RuleMethodType ( #PCDATA ) >
17        <!ELEMENT Code ( #PCDATA ) >
18        <!ELEMENT Operand ( #PCDATA ) >
19        <!ELEMENT FileID ( #PCDATA ) >
20        <!ELEMENT VOObjectID ( #PCDATA ) >
21    <!ELEMENT RuleEventSet ( RuleEvent+ ) >
22      <!ELEMENT RuleEvent ( Every | RuleEventID | RuleEventType |
23      RuleFunction | RuleMethodID )* >
24        <!ELEMENT Every ( #PCDATA ) >
25        <!ELEMENT RuleEventID ( #PCDATA ) >
26        <!ELEMENT RuleEventType ( #PCDATA ) >
27        <!ELEMENT RuleFunction ( #PCDATA ) >
28        <!ELEMENT RuleMethodID ( #PCDATA ) >
```

Table 3 provides an XML example of a FAM that complies with the XML definition of Table 2. In this example, there are five (5) DVR features (i.e., rewind, fast-forward, skip-to-live TV, record and find), three (3) methods (i.e., data-to-sts, file and SI vendor object) and four (4) events (i.e., every 5 minutes, every 24 hours, IRD reset and CAM inserted) in a FAM. Any one (1) of the four (4) events can trigger the evaluation of a method, the result of which can authorize or de-authorize the five (5) features. For example the 5 minute periodic event results in the evaluation of the first method (i.e., the data-to-sts) method. For this method, the FAM provides a unique reference (i.e., /code) to a previously specified data-to-sts command. This data-to-sts command can be a PIP test (i.e., as described above) or a CWP test (i.e., as described above). The evaluation of the PIP or CWP test results in a boolean (i.e., TRUE or FALSE). If the PIP test result is TRUE, the five (5) features are authorized; if FALSE, they are de-authorized.

TABLE 3

```
1   <?xml version="1.0"?>
2   <FeatureAuthorization>
3
4     <Title>Feature Authorization Information</Title>
5
6     <FileHeader>
7       <FileType>feature authorization</FileType>
8       <FormatVersion>01</FormatVersion>
```

TABLE 3-continued

```
9       <DataSource>caus</DataSource>
10      <CreationTime>2002/1/12 23:30:05</CreationTime>
11    </FileHeader>
12
13    <Token RecordNumber="1">
14      <FeatureSet>
15        <Feature>dvr.trick.pause30min</Feature>
16        <Feature>dvr.trick.Multi-speed_REW</Feature>
17        <Feature>dvr.trick.Multi-speed_FF</Feature>
18        <Feature>dvr.trick.Skip-to-live</Feature>
19        <Feature>dvr.trick.Record</Feature>
20        <Feature>dvr.trick.Find</Feature>
21      </FeatureSet>
22      <RuleMethodSet>
23        <RuleMethod>
24          <!--Test with the Data_to_STS code 12345 value 1-->
25          <!--Data_to_STS code and structure is TBD-->
26          <RuleMethodID>1</RuleMethodID>
27          <RuleMethodType>DataToSTS</RuleMethodType>
28          <Code>12345</Code>
29          <Operand>1</Operand>
30        </RuleMethod>
31        <RuleMethod>
32          <!--Test with the file id 12345-->
33          <!--The file is transmitted per the satellite file broadcast -->
34          <!--protocol. The file structure is TBD-->
35          <RuleMethodID>2</RuleMethodID>
36          <RuleMethodType>File</RuleMethodType>
37          <FileID>12345</FileID>
38        </RuleMethod>
39        <RuleMethod>
40          <!--test using VO object ID 12345-->
41          <!--VO structure TBD-->
42          <RuleMethodID>3</RuleMethodID>
43          <RuleMethodType>VO</RuleMethodType>
44          <VOObjectID>12345</VOObjectID>
45        </RuleMethod>
46      </RuleMethodSet>
47      <RuleEventSet>
48        <RuleEvent>
49          <!--test every 5 minutes-->
50          <RuleEventID>1</RuleEventID>
51          <RuleEventType>Periodic</RuleEventType>
52          <Every>00:05:00</Every>
53          <RuleMethodID>1</RuleMethodID>
54          <RuleFunction>enable</RuleFunction>
55        </RuleEvent>
56        <RuleEvent>
57          <!--test every 24 hours-->
58          <RuleEventID>2</RuleEventID>
59          <RuleEventType>Periodic</RuleEventType>
60          <Every>24:00:00</Every>
61          <RuleMethodID>3</RuleMethodID>
62          <RuleFunction>disable</RuleFunction>
63        </RuleEvent>
64        <RuleEvent>
65          <!--test every time the receiver resets-->
66          <RuleEventID>3</RuleEventID>
67          <RuleEventType>IRD Reset</RuleEventType>
68          <RuleMethodID>2</RuleMethodID>
69          <RuleFunction>enable</RuleFunction>
70          <RuleFunction>disable</RuleFunction>
71        </RuleEvent>
72        <RuleEvent>
73          <!--test every time the CAM is inserted-->
74          <RuleEventID>4</RuleEventID>
75          <RuleEventType>CAM Inserted</RuleEventType>
76          <RuleMethodID>3</RuleMethodID>
```

TABLE 3-continued

```
77       <RuleFunction>enable</RuleFunction>
78       <RuleFunction>disable</RuleFunction>
79      </RuleEvent>
80     </RuleEventSet>
81    </Token>
82
83  </FeatureAuthorization>
```

In addition to the above, Table 4 provides examples of the functions that may be utilized with a FAM.

TABLE 4

| | |
|---|---|
| Void initialize (char** fam_buf) | This function is called by the STS at power-up (at least) to initialize its internals. The argument is the address of a buffer to use for FAM storage. The size of this buffer must be at least 4096 bytes. |
| int FamReceived(char* fam) | This function must be called by the STS whenever a new FAM is received, whether in a FAM vendor object or in a FAM data-to-STS command. The buffer may be reused by the STS immediately after the call. The return value is zero if the FAM is valid and nonzero otherwise (e.g., due to authentication failure). |
| int TestFeature(int feature_code) | The STS calls this function to determine whether use of a controlled feature is authorized. The argument is one of a predefined set of feature codes. The return value is zero if the feature is not authorized. Otherwise the return value is a positive value indicating the number of seconds into the future for which the feature is to be considered authorized. The STS must call TestFeature( ) again within the specified interval to extend the authorization. |

To disable one or more features quickly (e.g., within T seconds), TestFeature( ) would not return a time larger than T. Thus, the functions of Table 4 provide a polling solution with customizable polling intervals. The expectation is that if a playback is begun after TestFeature( ) returns a time of one minute, then TestFeature( ) would be called again within one minute and the playback would be stopped if the answer the second time does not return a time period.

The application programming interface (API) functions described above are intended to be examples of the various types of functions that may be implemented and utilized. Variations and alternative API functions are also within the scope of this invention. For example, instead of the TestFeature( ) method specifying a time (for polling the vault manager) (as described above), the vault manager may utilize a push methodology. In a push model, the vault manager would asynchronously push a feature state change every time it occurs in the feature manager. Further, the feature manager would maintain a state table.

Accordingly, various additional API functions for a feature manager (i.e., from the vault manager to the feature manager) may be provided. For example, a function may provide the ability to: clean out/delete/purge soft features in the feature manager; set default feature state values; query existing feature states; and/or react to the default state of hard/soft features.

Integrated Receiver/Decoder

FIGS. 5A-D are a simplified block diagrams of an IRD 500. The IRD 500 receives and decrypts the media programs broadcast 118 by the video distribution system 100. These media programs are streamed to the IRD 500 in real time, and may include, for example, video, audio, or data services.

The IRD 500 is communicatively couple-able to a conditional access module (CAM) 502. The CAM 502 is typically implemented in a smart card or similar device, which is provided to the subscriber 110 to be inserted into the IRD 500. Vault Manager 504 and/or other applications in IRD 500 have a need to frequently check the state of IRD's 500 features. However, the evaluation of the features' rules may not be continuously executed. Such non-continuous execution is because rule evaluation is a high resource task that could interfere with normal conditional access functions of the IRD 500.

Vault manager 504 is responsible for maintaining information relating to the features in IRD 500. For example, when IRD 500 starts up or resets, vault manager may initialize the state of the IRD's 500 features. In this regard, vault manager 504 may push values into a feature state table. Additionally, timing requirements may cause the vault manager 504 to occasionally send newly evaluated rule results to the feature state table throughout the IRD's 500 normal operation.

The feature state table may also be referred to as a "feature manager" or cache since it may provide a high-speed cache of all feature states. Accordingly, the feature state table may be a random access memory (RAM) resident table so that tampering with the table while the IRD 500 is inactive is not possible.

Each row of the feature state table represents the state of a single feature. If a feature is internally represented by an integer, then indexing the table is straight forward. If features are internally represented as strings, then a prior step may be needed to map the string into an integer to allow table indexing. Alternatively, some higher order languages provide symbol indexed tables intrinsically and the compiler or interpreter may handle the indexing via strings.

Once the vault manager 504 receives one or more FAMs, the vault manager 504 obeys the timing requirements and sends initial evaluation results to the feature manager/feature state table. In order to get a FAM, the vault manager 504 either receives it from the broadcast 118 or retrieves it from non-volatile memory (NVM) 506. Upon IRD 500 initialization, fresh acquisition of a FAM is preferred. In the later case, NVM 506 storage must be signed so that no FAM tampering could have occurred while the receiver 500 was powered off. In either case, signature validation may be required on all retrieved FAMs from the transmission broadcast 118 or from NVM 506.

Two methods may be used to protect and validate FAMs stored in NVM 506 from unauthorized tampering.

Encryption by the Receiver for NVM Storage

Figure 5A:
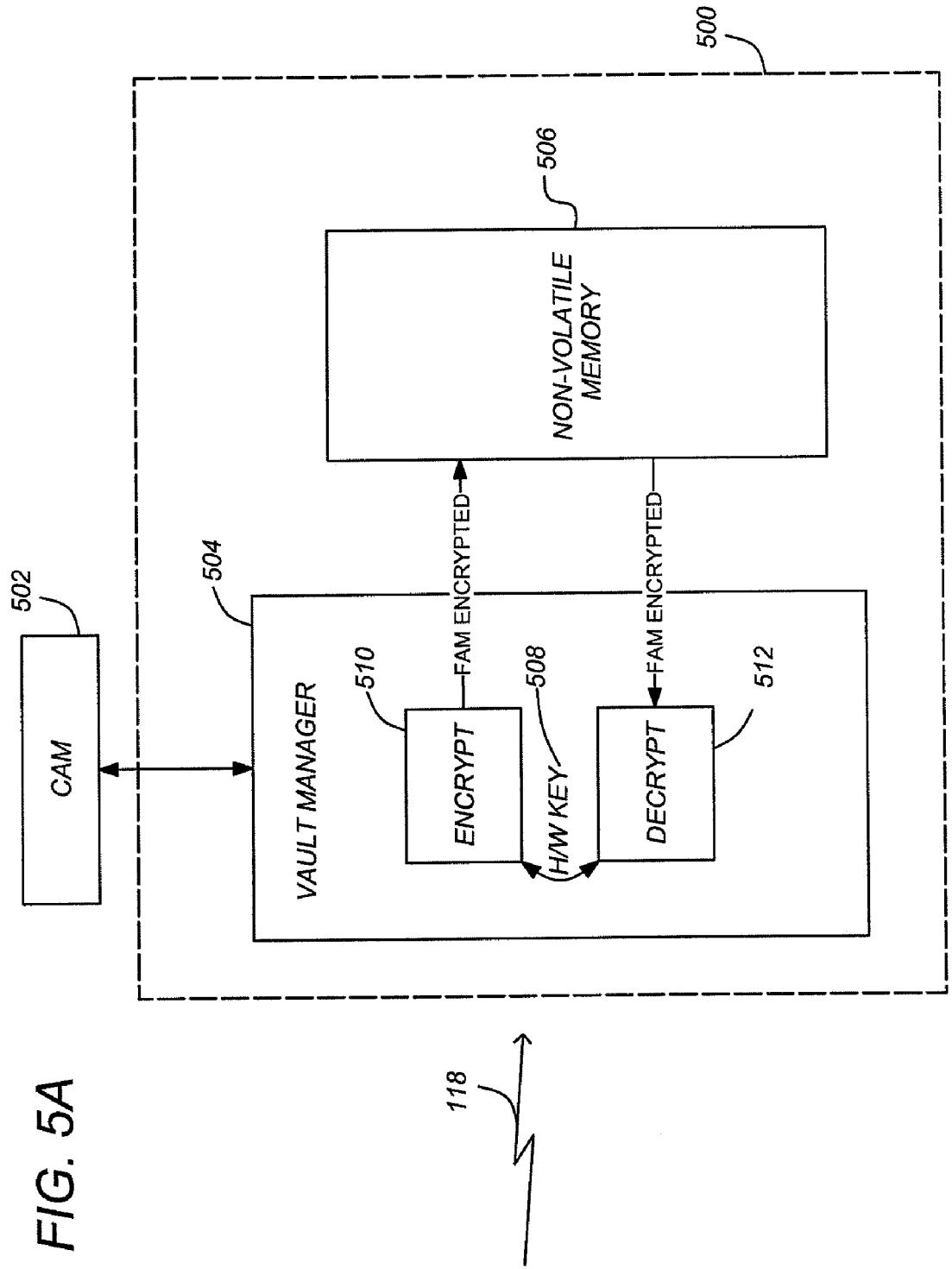
FIG. 5A illustrates how encryption/decryption may be performed in accordance with one or more embodiments of the invention.

If storage in NVM 506 is to be performed, a unique key is needed to prevent wide spread distribution of a tampered FAM. FIG. 5A illustrates how such an encryption/decryption could be done, using a unique private key 508 assigned to the receiver 500. These unique keys 508 must be securely handled by the receiver 500 hardware (e.g., using encrypting 510 and decrypting 512 modules) so that the keys 508 are never exposed. Every receiver 500 would store a FAM that is uniquely encrypted 510 for successful read-back and subsequent acceptance by the vault manager 504. The advantage of this approach is that the receivers 500 need not acquire FAMs from the satellite 108 upon IRD 500 initialization. This potentially minimizes satellite 108 bandwidth requirements and receiver 500 initialization processing delay for older subscribers 122. However, because the broadcast still needs to support new subscribers 122 that must acquire FAMs for the first time, there may not be any bandwidth savings.

Encryption Only by the Broadcaster

Figure 5B:
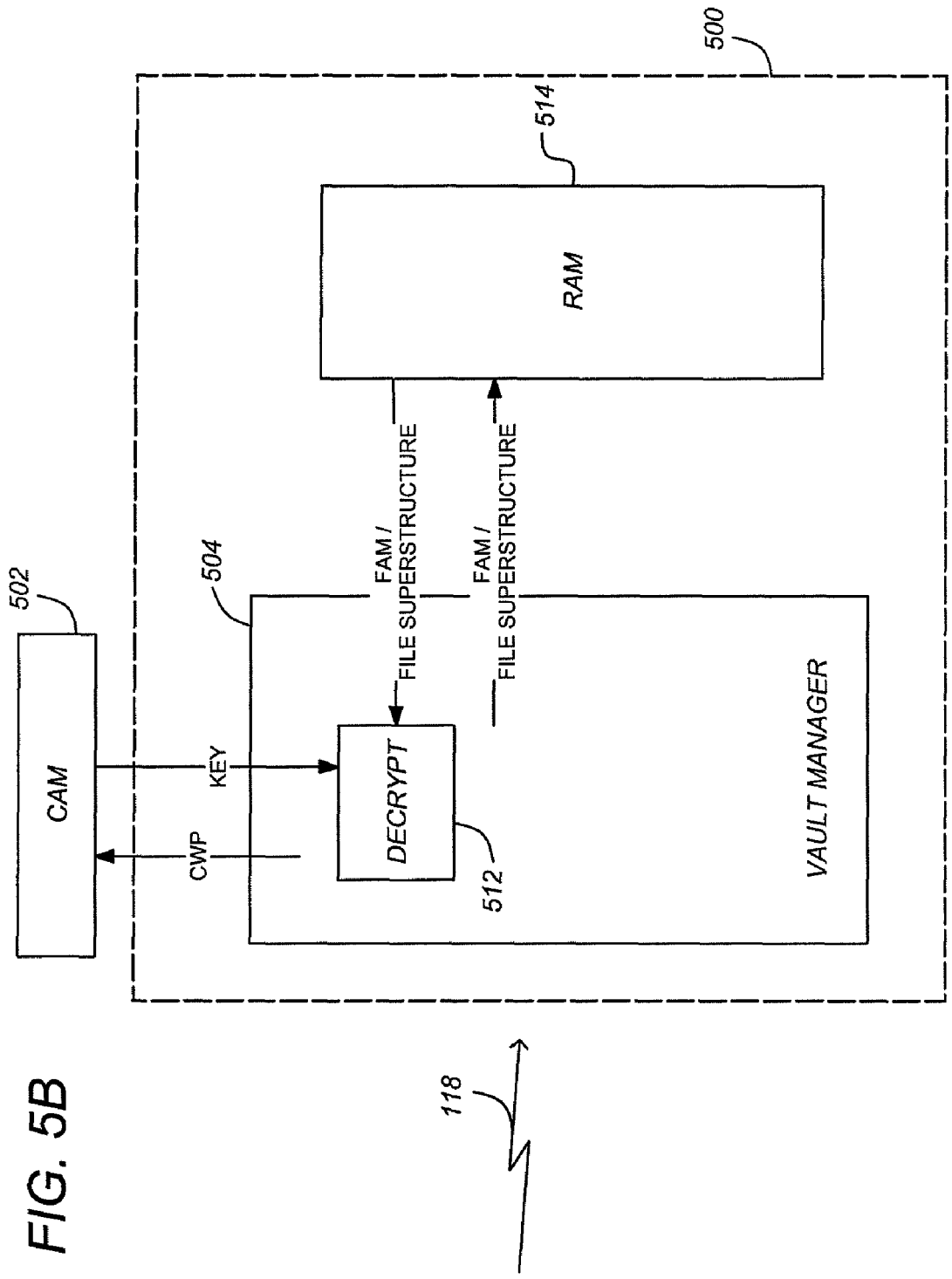
FIG. 5B illustrates the use of a FAM that has been broadcast as an already encrypted entity in accordance with one or more embodiments of the invention.

A second method is to broadcast every FAM as an already encrypted entity and never allow NVM 506 storage. FIG. 5B illustrates such a methodology. The broadcaster's encryption key would provide sufficient security in this case, because the FAM in RAM 514 would not be exposed by the receiver 500 application for external tampering and replacement back to RAM 514. The FAM will be encapsulated in a super-structure that can be used to (1) decrypt 512 the FAM and to (2) authenticate the FAM as being from the network operator.

Figure 6:
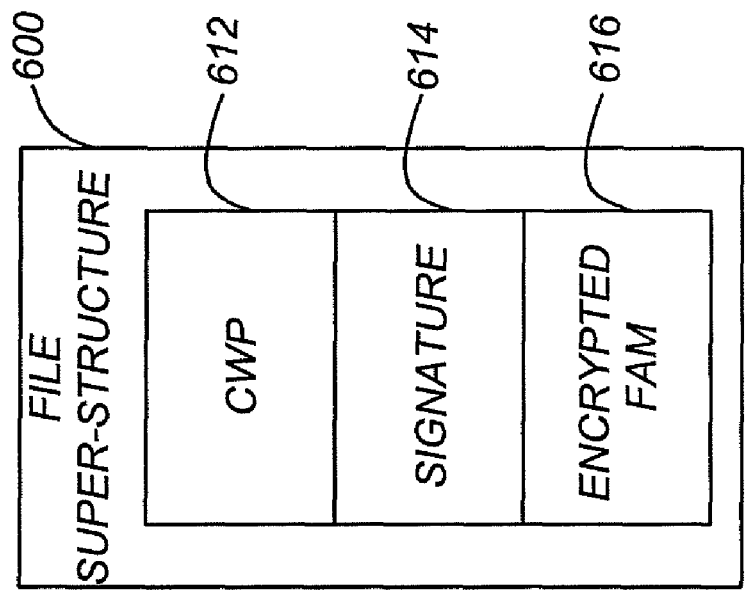
FIG. 6 illustrates a file superstructure in accordance with one or more embodiments of the invention.

FIG. 6 illustrates the file superstructure in accordance with one or more embodiments of the invention. As illustrated, the super structure 600 has three elements: (1) A control word packet 602 that generates the decryption key, (2) a signature 604 that authenticates the FAM, and (3) an encrypted FAM 606. Using the method illustrated in FIG. 5B, the Vault Manager 504 has no need to encrypt or to have a unique private key. The Vault Manager 504 can authenticate the FAM when it is acquired and is only allowed to store the FAM in RAM 514. As illustrated in FIG. 5B, CAM 502 communicates with the Vault Manager 504 (e.g., using a control word packet (CWP) and key). The Vault Manager 504 may then store and retrieve the super structure 600 in RAM 514.

Figure 5C:
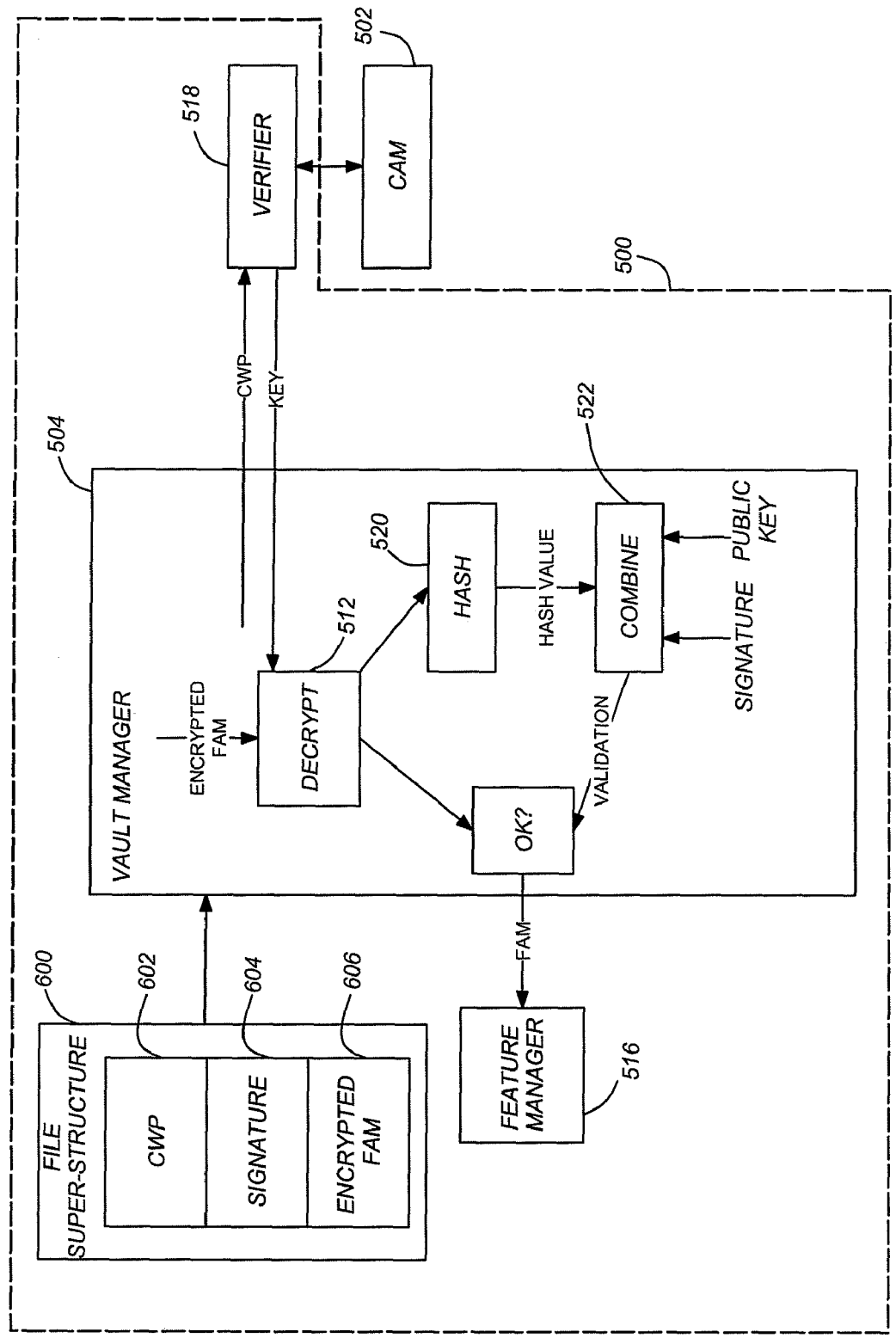
FIG. 5C illustrates the steps to process a file super structure to derive the FAM in accordance with one or more embodiments of the invention.

The steps to process the file super structure 600 to derive the FAM are illustrated in FIG. 5C. Vault Manager 504, which is communicatively coupleable to the CAM 502, receives the file superstructure 600. The CAM 502 interfaces with a conditional access verifier (referred to as verifier) 518 which performs at least some of the functions necessary to verify that the subscriber 110 is entitled to access the media programs.

The Vault Manager communicates with the verifier 518 by delivering the CWP 602 from the file superstructure 600 to verifier 518. The control word (CW) key is obtained from the CWP 602 using the verifier 518 and the CAM 502. The CW key is then transferred back to the Vault Manager 504 from the verifier 518.

Once Vault Manager 504 receives the appropriate CW key, it may use the key to decrypt 512 the encrypted FAM 606 received in the file super-structure 600. In this regard, the CW key may be processed in a hash function 520 to obtain a hash value. The hash value may then be combined 522 with the signature 604 from the file super-structure 600 and a public key in order to validate and authenticate the FAM. If the validation is successful, the decrypted FAM is provided to the feature manager 516.

It should be noted that the use of such a CWP and CW to successfully decrypt and validate the FAM may only be performed when the CAM has the appropriate authorizations. Note also that this novel use of a CWP and CW may be applied instead of or in addition to the use of one or more CWP and CW in the evaluation of a rule in processing a FAM, as disclosed earlier herein.

Figure 5D:
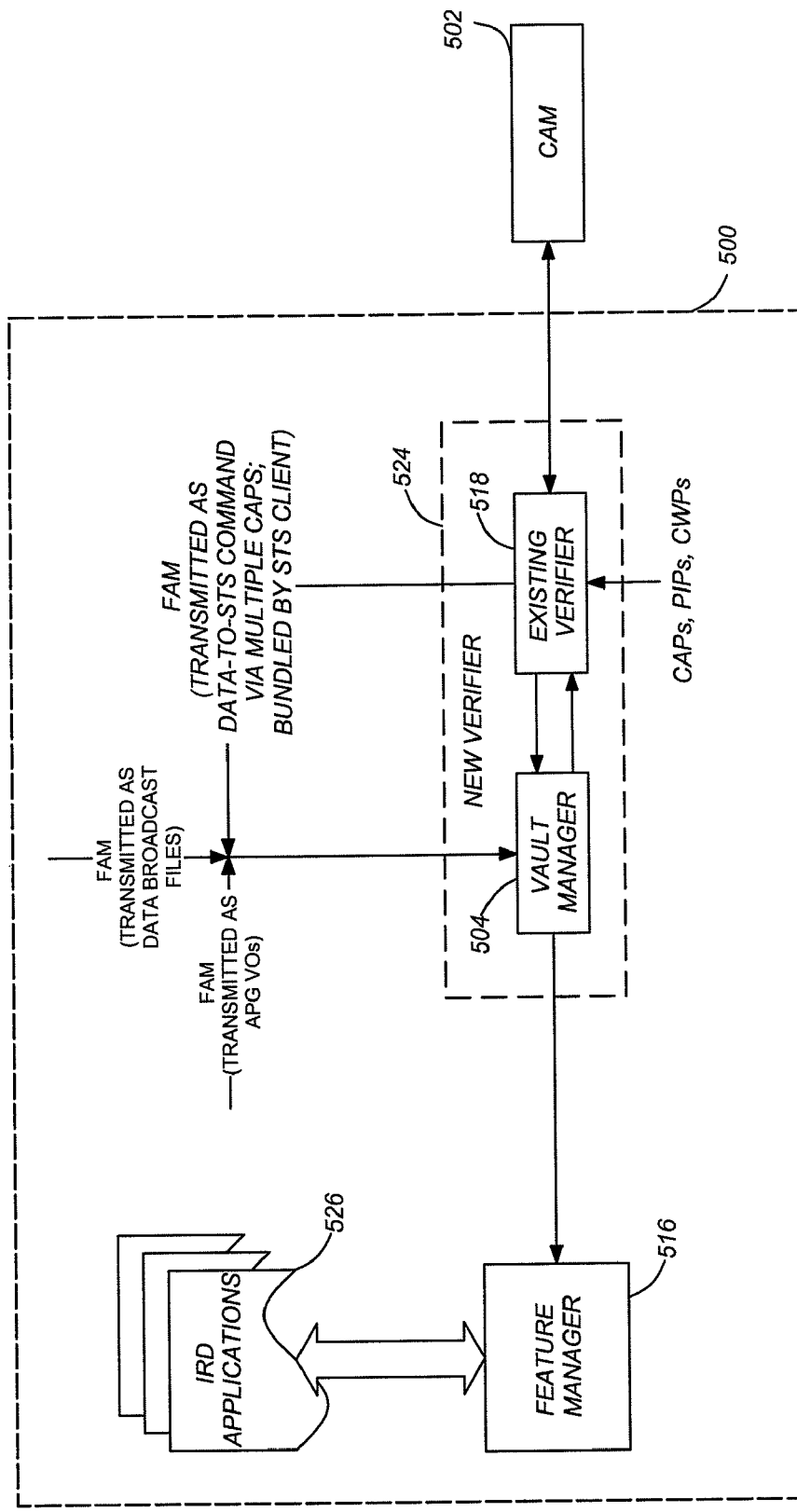
FIG. 5D further illustrates the processing of a FAM in accordance with one or more embodiments of the invention.

In accordance with various embodiments of the invention, Vault Manager 504 processes all FAMs, evaluates them according to the rules, and sends their results to the feature manager 516. FIG. 5D further illustrates the processing of a FAM. As illustrated, The FAM may be transmitted to the IRD 500 via APG VOs, data broadcast files, or data-to-sts commands via multiple CAPs (bundled by an STS client). Once received, the new verifier 524 (which essentially comprises the existing verifier 518 [as described above] and the vault manager 504) processes the FAMs, evaluates them according to the rules, and send their results to the feature manager 516 which may interact with other IRD 500 applications. Thus, FAMS provide the capability to activate set-top box 500 functionality. Further, the FAM allows structured rules and timing requirements to improve confidence of entitled services.

Logical Flow

Figure 7:
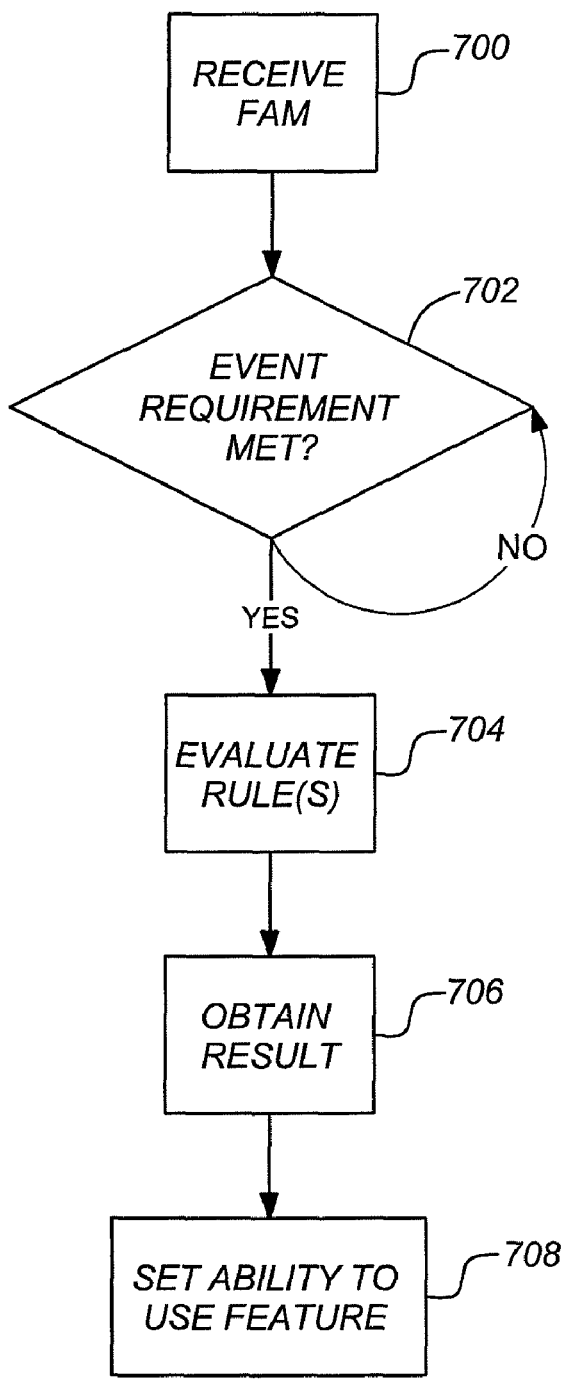
FIG. 7 is a flowchart illustrating the logical flow for activating functionality in accordance with one or more embodiments of the invention.

FIG. 7 is a flowchart illustrating the logical flow for activating functionality in accordance with one or more embodiments of the invention. At step 700 a FAM is received in an STB 500. As described above, the FAM comprises: (1) one or more rules to be evaluated (wherein each rule comprises one or more tests for a status of one or more CAM 502 attributes); (2) one or more event requirements for rule evaluation; and (3) one or more features that are dependent by the rule evaluation result (wherein each of the features represents one or more abilities of the hardware and/or software of the STB 500).

At step 702, a determination is made if one or more of the event requirements have been met. As illustrated, the process does not continue until an event requirement has been met. Event requirements may comprise a periodic time interval, a system state, or a customer action, for example. Once an event requirement has been met, one or more rules are evaluated at step 704 to obtain a result at step 706. In this regard, the features that are tested may be evaluated using a cache that is maintained in the STB 500 that contains states for each of the one or more features. Additionally, the features may comprise an abstract identifier that the STB 500 recognizes and maps to the set of one or more abilities. The ability to use the one or more features set forth in the FAM is then set based on the result at step 708. Setting such an ability may comprise setting an interval of time for which the one or more features are enabled/disabled.

As described above, the FAM may be embedded in a conditional access packet that carries a data-to-sts command, may be received in an encrypted file via a satellite data broadcast protocol specification, may be received in a system information control system, and/or may be embodied inside a program guide vendor object. Accordingly, the FAM may be uniquely encrypted and then stored in the nonvolatile memory of the STB 500. Alternatively, the FAM be stored in random access memory. Further, the FAM may be received in a super-structure that contains a control word packet (that generates a decryption key), a signature that authenticates the FAM, and an encrypted FAM.

CONCLUSION

This concludes the description of one or more embodiments of the present invention. The foregoing description of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of activating a feature in a conditional access system comprising:

receiving a feature authorization message (FAM) comprising a rule for activating a feature of the conditional access system based on a status of one or more attributes of a conditional access module (CAM), said rule specifying test data and status assessment data;

providing said test data to said CAM, and receiving output data dependent on said test data and said one or more attributes of said CAM;

assessing the status of said one or more attributes based on said output data and said status assessment data; and setting the ability to use said feature based on said status.

2. The method of claim 1, wherein the FAM is embedded in a conditional access packet.

3. The method of claim 1, wherein the FAM is received in an encrypted file via a satellite data broadcast protocol specification.

4. The method of claim 1, wherein the FAM is received in a system information control stream.

5. The method of claim 4, wherein the FAM is embodied inside a program guide vendor object.

6. The method of claim 1, wherein the test data is provided to said CAM when an event requirement associated with the rule is satisfied.

7. The method of claim 1, wherein the feature comprises a set of one or more abilities of hardware and/or software.

8. The method of claim 7, wherein the feature comprises an abstract identifier that is recognized and is mapped to the set of one or more abilities.

9. The method of claim 1, further comprising storing a state for said feature in cache memory.

10. The method of claim 1, further comprising:
encrypting the FAM; and
storing the encrypted FAM in nonvolatile memory.

11. The method of claim 1, further comprising storing the FAM in random access memory (RAM).

12. The method of claim 1, wherein the FAM is received in a data structure comprising:
a control word packet that generates a decryption key;
a signature that authenticates the FAM; and
an encrypted FAM.

13. The method of claim 1, wherein setting the ability to use the feature comprises setting an interval of time for which the feature is enabled.

14. The method of claim 1, wherein the feature is activated in a set-top box.

15. The method of claim 1, wherein:
said test data comprises program access data which specifies service access requirements and limitations;
said output data comprises the result of a comparison of service authorization and other attribute data of the CAM with said service access requirements and limitations in said program access data; and
said status assessment data comprises a desired output data that should occur when the CAM attributes correspond to a desired status.

16. The method of claim 1, wherein:
said output data comprises an encryption or decryption of said input data;
said CAM attributes comprise encryption or decryption keys and algorithms; and
said status assessment data comprises a desired output data that should occur when the CAM attributes correspond to a desired status.

17. An apparatus for activating a feature in a conditional access system comprising:
means for receiving a feature authorization message (FAM) comprising a rule for activating a feature of the conditional access system based on a status of one or more attributes of a conditional access module (CAM), said rule specifying test data and status assessment data;
means for providing said test data to said CAM, and receiving output data dependent on said test data and said one or more attributes of said CAM;
means for assessing the status of said one or more attributes based on said output data and said status assessment data; and
means for setting the ability to use said feature based on said status.

18. The apparatus of claim 17, wherein the FAM is received in a data structure comprising:
a control word packet that generates a decryption key;
a signature that authenticates the FAM; and
an encrypted FAM.

19. The apparatus of claim 17, wherein:
said test data comprises program access data which specifies service access requirements and limitations;
said output data comprises the result of a comparison of service authorization and other attribute data of the CAM with said service access requirements and limitations in said program access data; and
said status assessment data comprises a desired output data that should occur when the CAM attributes correspond to a desired status.

20. The apparatus of claim 17, wherein:
said output data comprises an encryption or decryption of said input data;
said CAM attributes comprise encryption or decryption keys and algorithms; and
said status assessment data comprises a desired output data that should occur when the CAM attributes correspond to a desired status.

\* \* \* \* \*